United States Patent [19]

Goto

[11] Patent Number: 4,647,747

[45] Date of Patent: Mar. 3, 1987

[54] ARM EXTENDING THROUGH A WORK PAN OF A WIRE EDM PERMITTING IMPROVED ARM MOVEMENT

[75] Inventor: Makoto Goto, Toki, Japan

[73] Assignee: Brother Kogyo Kabushiki Kaisha, Aichi, Japan

[21] Appl. No.: 702,674

[22] Filed: Feb. 19, 1985

[30] Foreign Application Priority Data

Feb. 29, 1984 [JP] Japan .................................. 59-39075

[51] Int. Cl.⁴ ........................ B23H 1/00; B23H 7/10; F16J 15/56
[52] U.S. Cl. ................................ 219/69 W; 204/206; 219/69 R; 277/30; 285/24; 285/27
[58] Field of Search ............... 219/69 W, 69 R, 69 D; 277/30; 285/24, 27; 204/206, 224 M

[56] References Cited

U.S. PATENT DOCUMENTS

| | | | |
|---|---|---|---|
| 2,824,944 | 2/1958 | Ammerman | 285/27 |
| 2,969,248 | 1/1961 | Sulkowski | 277/30 |
| 4,229,010 | 10/1980 | St. Laurent, Jr. | 277/30 |
| 4,270,775 | 6/1981 | Noensie et al. | 285/24 |
| 4,521,661 | 6/1985 | Inoue | 219/69 W |
| 4,565,915 | 1/1986 | Girardin | 219/69 W |

FOREIGN PATENT DOCUMENTS

| | | | |
|---|---|---|---|
| 157435 | 12/1980 | Japan | 219/69 W |
| 138528 | 8/1982 | Japan | 219/69 C |
| 59-14428 | 1/1984 | Japan | 219/69 W |

*Primary Examiner*—A. D. Pellinen
*Assistant Examiner*—Geoffrey S. Evans
*Attorney, Agent, or Firm*—Parkhurst & Oliff

[57] ABSTRACT

A wire cutting type electrical discharge machining system in which a work pan can be made smaller in size than that in prior art by virtue of changing its structure. The device has (a) a work pan for supporting a workpiece therein including a side wall which has an elongate aperture extending horizontally and having guide grooves along upper and lower sides of the elongate aperture, (b) a lower arm extending laterally through the elongate aperture inwardly into the work pan as far as below the workpiece, (c) a closure strip disposed along the elongate aperture for closing it substantially fluid-tightly by being guided in the guide grooves, top and bottom, and provided with a hole in a longitudinally central position thereof for allowing the lower arm to slidably extend therethrough, and (d) annular sealing means disposed in the closure strip for allowing the lower arm to move fluid-tightly in the longitudinal direction thereof. The lower arm can freely move in any desired direction while being well sealed in the compactly made work pan.

11 Claims, 7 Drawing Figures

ARM EXTENDING THROUGH A WORK PAN OF A WIRE EDM PERMITTING IMPROVED ARM MOVEMENT

FIELD OF THE INVENTION

This invention relates to a wire cutting type electrical discharge machining system for machining an electrically conductive workpiece by means of an electrical discharge energy which is generated between a continuously fed wire electrode and the workpiece.

BACKGROUND OF THE INVENTION

In a traditional machining system of this category wherein the machining operation is performed while a workpiece is immersed in a machining fluid filled in a work pan, the work pan must be large enough to be able to accommodate therein the whole of the lower arm, as can be seen in, for example, U.S. Pat. No. 4,029,929 and U.S. Pat. No. 4,367,129. It is therefore liable to disadvantageously make the whole system large in size through inevitable enlarging of the work pan.

SUMMARY OF THE INVENTION

It is, accordingly, an important object of the invention to provide an improved wire cutting type electrical discharge machining system, wherein a work pan is made small in size, through a specific structure forming an aperture in a side wall of the work pan to allow the lower arm to extend into the pan through the aperture, and to permit relative movement between the work pan and the lower arm to the extent required for the machining while preventing leakage of the machining fluid between the two members.

According to the present invention, there is provided a wire cutting type electrical discharge machining system for removing metal by means of an electrical discharge energy between a workpiece and a wire electrode which is continuously fed lengthwise relative to the workpiece, which system comprises, as described below in detail, a work pan, a lower arm, and a closure strip.

(a) The work pan, for supporting the workpiece therein, includes a side wall having an elongate aperture extending substantially horizontally. (b) The lower arm extends horizontally or laterally through the elongate aperture into the work pan to a position below the workpiece for carrying a lower electrode guide so as to guide the wire electrode. This lower arm is movable relative to the work pan in a longitudinal direction of the elongated aperture. (c) The closure strip is disposed along the elongate aperture for the purpose of closing the elongate aperture substantially fluid-tightly. This closure strip is further slidable in the longitudinal direction of the elongate aperture. The closure strip has, in a longitudinally central portion thereof, a hole provided with annular sealing means through which the lower arm extends fluid-tightly as well as slidably in a longitudinal direction thereof. The closure strip provides fluid-tight sealing between the work pan and the lower arm, while allowing relative movements between the two members in the aforementioned two longitudinal directions.

In the wire cutting type electrical discharge machining system constructed as described above, the work pan can be compact in size, which will greatly contribute to making the whole system compact. Further, the simple structure of the system economizes the manufacturing cost thereof.

According to an embodiment of this invention, the side wall has guide grooves along upper and lower sides of the elongate aperture for guiding therein upper and lower widthwise edge portions of the closure strip.

According to an advantageous embodiment of the invention, the closure strip is made of a flexible material, opposite end portions of the closure strip being wound on a pair of reels, respectively, which are rotatably supported by the work pan. The pair of reels are preferably accommodated in a pair of recesses formed in an outer surface of the work pan at the opposite ends of the side wall as viewed in the longitudinal direction of the elongate aperture. In this embodiment a portion of the closure strip that is temporarily not in service closing the elongate aperture can be compactly accommodated or stored, which is greatly meritorious for making the whole system compact.

The closure strip, a closure member for closing the elongate aperture, may be made of a resilient material and may have a suitable form to enable the opposite end portions thereof to be wound up on the pair of reels by their own resiliency. A central portion of the closure strip unwound to be straight extends along the elongate aperture and is curved in an arcuate shape in cross section taken across the width thereof. This widthwise arcuate shape of the straightly extending portion of the closure strip greatly serves, in spite of the fact that the guide grooves are of sufficiently larger width than the thickness of the closure strip itself for allowing smooth sliding of the closure strip therealong, to keep good fluid tightness ability of the upper and lower widthwise edge portions of the closure strip due to a nice and optimal contact thereof with the both inner surfaces of the corresponding guide groove, that is to say, a close contact between the tip of a slightly inwardly curved side of the strip and the rear inner surface of the guide groove, and the other close contact between a slightly outwardly curved near end portion of the strip and the front inner surface of the guide groove.

The work pan is preferably provided with a frame like guide plate fixed to the side wall. The guide plate is formed with an elongate opening, in a central portion thereof, having the same dimensions as the elongate aperture. The guide plate is further formed with a shallow groove, in one of opposite surfaces thereof, facing an outer surface of the side wall of the work pan. The shallow groove extends along the elongate aperture and covers inner peripheral areas which define four sides of the elongate opening, the shallow groove and the outer surface of the side wall cooperating to define the guide grooves. Such a structure is greatly helpful in facilitating formation of the guide grooves and mounting of the closure strip to the work pan.

According to another advantageous embodiment of this invention, the lower arm is formed as a tubular member through which the wire electrode extends to run. The tubular arm may also serve as a conduit for supplying a machining fluid to the work pan, and/or as a conduit for discharging the machining fluid. Furthermore, the lower arm is preferably made of an electrically conductive material, and it defines a passage for a power cable to supply power to the wire electrode such that the power cable is electrically insulated from the lower arm. The lower arm is connected to a grounding terminal of a power source, while the power cable is connected to the other terminal of the power source.

Such a structure of making the lower arm hollow or tubular, for utilizing the same as the passage for passing the wire electrode, machining fluid, power cable, etc. therethrough, contributes to simplification of the structure, with beneficial results of giving the system a good and neat appearance as well as lowering the manufacturing cost of the system. Another merit of the device, passing the power cable through the tubular lower arm, is electrical noise absorption effect, because it works as a sort of coaxial cable.

BRIEF DESCRIPTION OF THE DRAWINGS

The aforementioned object and features of the invention as well as advantages thereof will become more readily apparent from the following description taken with reference to the accompanying drawings in which.

DETAILED DESCRIPTION OF THE PREFERRED EMBODIMENT

Figure 1:
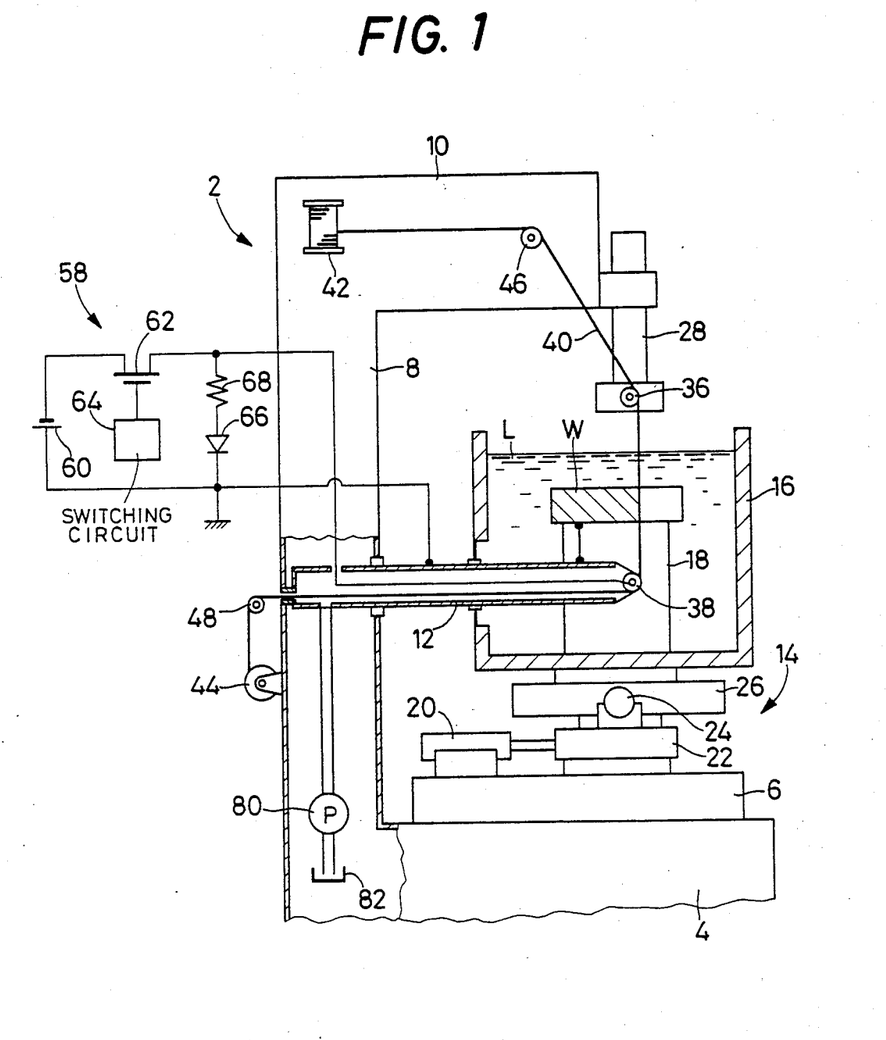
FIG. 1 is an explanatory diagrammatical vertical cross section, partially illustrated, of an embodiment of a wire cutting type electrical discharge machining system according to this invention.

A wire cutting type electrical discharge machining system according to the invention is provided with a frame 2, as can clearly be seen in FIG. 1, which frame 2 includes in turn a base 4, a bed 6 mounted thereupon, a column 8 which is erected on top of one end portion of the bed 6, an upper arm 10 extending horizontally from the upper end of the column 8 rightward in respect to FIG. 1, and a lower arm 12 extending in parallel with the upper arm 10 from the middle portion of the column 8. On the bed 6 there is disposed a work pan 16 filled with machining fluid therein, by way of an X-Y feed device 14, movable in a horizontal plane. On the bottom wall of the work pan 16 a table 18 for supporting a workpiece W is disposed. The above-mentioned X-Y feed device 14 is provided with a Y-slide 22 mounted on the bed 6, movable in the Y-axis directions, i.e., the leftward and rightward directions, in a horizontal plane, by the action of a Y-feed motor 20, and an X-slide 26 mounted on the Y-slide 22, movable in the X-axis directions perpendicular to the Y-axis, i.e., the forward and backward directions, by the action of an X-feed motor 24. The workpiece W can be, due to the combined operation of the Y-slide 22 and the X-slide 26, fed in any desired direction in the horizontal plane.

The upper arm 10 is, at the tip portion thereof just above the work pan 16, provided with a height adjustable head 28 having on the lower end thereof an upper electrode guide 36. The lower arm 12 extends on the other hand passing through one side wall of the work pan 16 as far as a position just beneath the workpiece W. The lower arm 12 is a tubular member, made of an electrically conductive material, being fixed at its root portion onto the column 8, but electrically insulated therefrom. On the tip of the lower arm 12 a lower electrode guide 38 having an electrically conductive roller is mounted in an electrically insulated manner thereon.

On the upper portion of the column 8 a wire supply device 42 is disposed for supplying a wire electrode 40 constituted of a metallic wire. On the lower portion of the column 8 a wire take-up device 44 for winding up the wire electrode 40 is disposed. The wire electrode 40 fed from the wire supply device 42 is, by way of a guide roller 46 and the upper electrode guide 36, continuously delivered to the machining space in the work pan 16. The already worked portion of the wire electrode 40 is recovered or collected on the wire take-up device 44 by way of the lower electrode guide 38 and a guide roller 48.

To the wire electrode 40 and the workpiece W a power circuit 58 is connected for repeatedly generating pulse discharges between the two (40. W). The then produced discharge energy is used for the machining of the workpiece W. Speaking more specifically, to one terminal of a DC power supply 60 is connected a source terminal of a field-effect transistor 62; to the gate terminal thereof is connected a switching circuit 64 for controlling the switching operation of the transistor 62. Between the drain terminal of the transistor 62 and the other terminal of the DC power supply 60 a diode 66 and a resistor 68 are connected for erasing the reactance generated by the switching operation of the transistor 62. The workpiece W is connected by way of the electrically conductive lower arm 12 to a grounding terminal of the power circuit 58; and the wire electrode 40 is on the other hand connected to the other terminal of the power circuit 58 by way of the lower electrode guide 38.

A pump 80 is communicated with the lower arm 12, through the operation of which pump 80 the machining fluid L is supplied from a tank 82 flowing through the lower arm 12 so as to fill up the work pan 16 at the beginning of the machining, and as to clear the machining gap between the wire electrode 40 and the workpiece W during the machining operation.

The sealing structure between the side wall of the work pan 16 and the lower arm 12 piercing through the former and also the inside structure of the lower arm 12 will be described in detail below.

Figure 2:
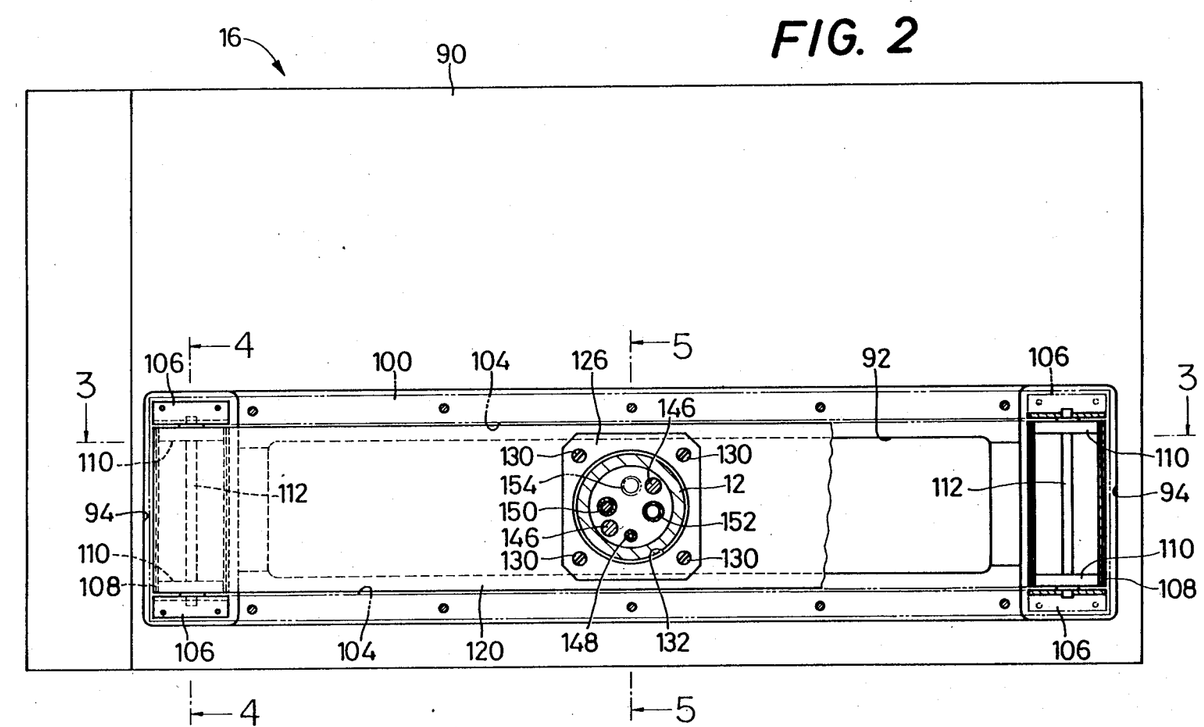
FIG. 2 is an enlarged elevational view, partially broken away, of the work pan seen from the left side thereof, in respect to FIG. 1.

At a near-the-lower-end portion of one side wall 90 of the work pan 16 an elongate aperture 92 for the lower arm 12 is formed in a substantially horizontal direction. On opposite ends of the side wall 90 of the work pan 16, i.e., on either side of the elongate aperture 92 an outwardly opened recess 94 is respectively formed. On the outer surface of the work pan 16 a fluid channel 96 for receiving leaked fluid from the work pan 16 is formed along the elongate aperture 92, and a drain port 98 is formed in communication with one end of the fluid channel 96.

The work pan 16 is provided with a frame-like guide plate 100 fixed to the side wall 90. The guide plate 100 has in a central portion thereof an elongate opening 102 of substantially the same dimensions as the elongate aperture 92 so that the guide plate 100 surrounds the elongate aperture 92. The guide plate 100 is formed with a shallow and wide groove 103 in one of the opposite surfaces thereof facing an outer surface of the side wall 90 of the work pan 16. The shallow groove 103 extends along the elongate aperture 92 and covers inner peripheral areas which define four sides of the elongate opening 102. The shallow groove 103 and the outer surface of the side wall 90 cooperate to define a pair of guide grooves 104 extending along upper and lower sides of the elongate aperture 92 respectively.

On the inner or rear side of the opposite end portions of the guide plate 100 a pair of retainer plates 106, upper and lower, are attached respectively projecting inward into the recess 94 formed in the side wall 90 of the work pan 16. Between the pair of upper and lower retainer plates 106 in each of the pair of recesses 94 a reel 108 is rotatably retained respectively. The reel 108 is in this embodiment constituted of a pair of upper and lower disks 110 and a rotatable shaft 112 which links the disks 110.

The above-mentioned pair of reels 108 sustain therebetween a closure strip 120 made of a flexible and resilient material such as a stainless spring steel, which is capable of taking a suitably wound form to enable the opposite end portions thereof to be wound on the pair of reels 108 by their own resiliency. The wound strip of this sort is available on the market, for example, a flat spiral spring widely used for giving constant force to a displaceable body irrespective of its position such that the body may be stopped at any desirable position. A central portion of the closure strip 120 is unwound to extend along the elongate aperture 92 while upper and lower widthwise edge portions thereof are guided by the guide grooves 104.

Figure 7:
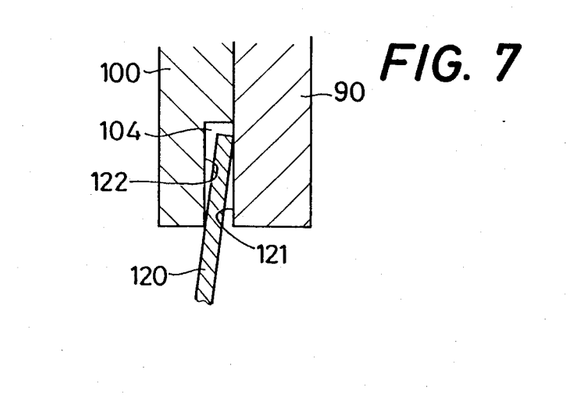
FIG. 7 is an enlarged cross section, cut perpendicularly to, for explaining the close contact between, the guide groove and the upper end portion of the closure strip.

The closure strip 120 has a liability, due to the physical properties of the plastically deformed resilient material, of being outwardly slightly curved, when it is unwound straightly in the central portion thereof, in the widthwise direction. This phenomenon advantageously brings about close contacts in two places as shown in FIG. 7 between the inner surfaces 121, 122 of the guide grooves 104 and the upper and lower ends of the closure strip 120. In other words, one close contact between the tip of a slightly inwardly curved side of the closure strip 120 and the rear inner surface 121 of the guide groove 104, and the other close contact between a slightly outwardly curved near end portion of the closure strip 120 and the front inner surface 122 of the guide groove 104, serve to keep optimal sealing between the work pan 16 and the closure strip 120.

Figure 4:
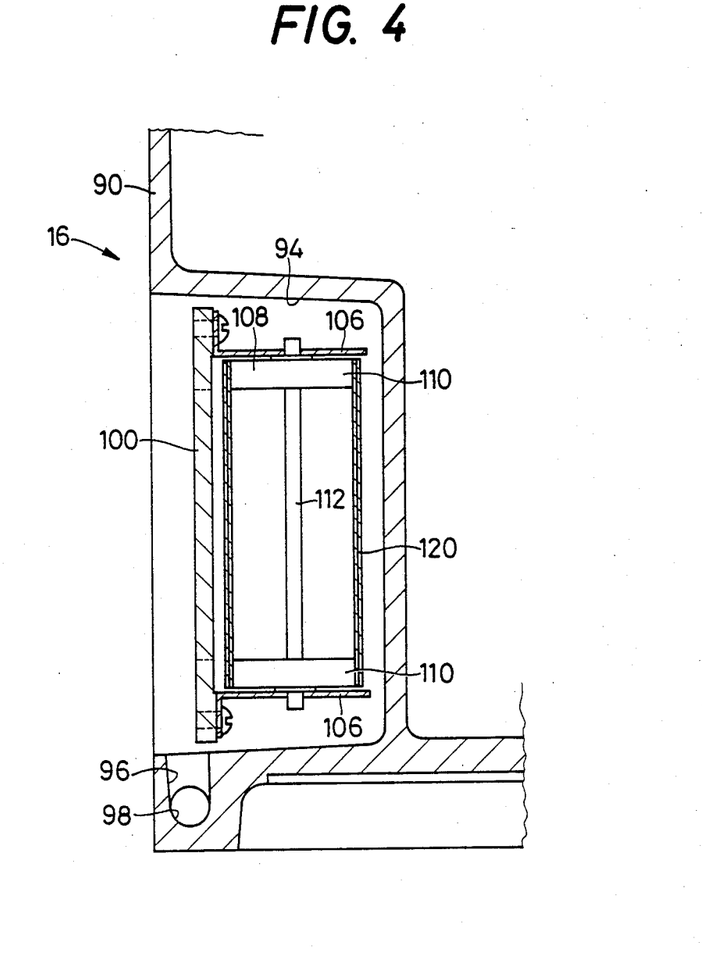
FIG. 4 is a partial enlarged cross section taken along the line 4—4 in FIG. 2.

In a hole 124 formed substantially in the middle portion of the closure strip 120 a packing retainer 126 is put. When the packing retainer 126 is put in the hole 124, a fixing plate 128 is fit thereon from the opposite side of the closure strip 120 so as to sandwich the same, with a plurality of screws 130 for fixing the fixing plate 128 to the packing retainer 126. The packing retainer 126, which is provided with a center hole 132, is fixed in this manner around the periphery of the hole 124. On the internal periphery of the center hole 132, a packing 134 which is closely contactable with the outer surface of the lower arm 12 is being put in. The packing retainer 126, the fixing plate 128, the packing 134, etc., constitute annular sealing means.

Figure 6:
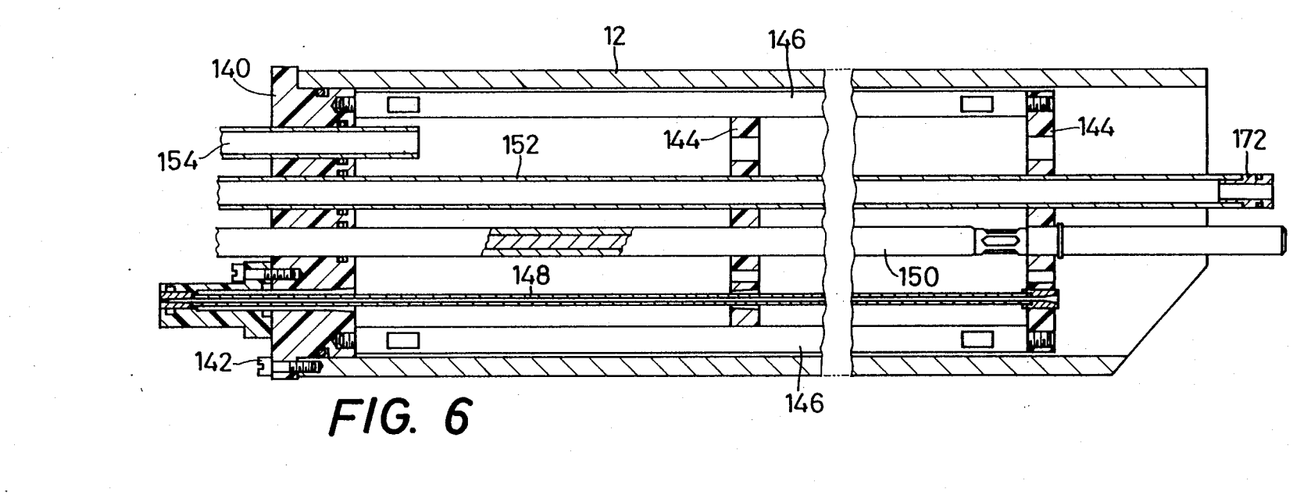
FIG. 6 is a partial enlarged cross section of the lower arm, being so cut as to pass along the axial line of the pipes running inside.

The lower arm 12 constituted of an electrically conductive tubular member has, at the outermost end thereof, a fit-in end plate 140, and a plurality of support plates 144 made of a non-conductive material arranged inside at predetermined intervals, as clearly shown in FIG. 6. Between the end plate 140 and the innermostly positioned support plate 144 a plurality of support rods 146 are spanned for fixing the two members together. A longitudinally extending wire guide pipe 148 is retained, at the bottom position of the lower arm inside, in a manner extending through the end plate 140 and the support plates 144 for the purpose of passing the wire electrode 40 therethrough. In the lower arm 12 a power cable 150 is also installed, being supported by the end plate 140 and the support plates 144, for supplying power to the wire electrode 40 therethrough.

In the lower arm 12 a fluid supply conduit 152 is also disposed, being supported by the end plate 140 and the support plates 144 in a manenr of extending therethrough, with the object of supplying the machining fluid L, during the machining operation, through the same into the machining gap between the wire electrode 40 and the workpiece W. A fluid pipe 154 retained by the end plate 140, while passing the same, at the upper portion of the outer end of the lower arm 12 is to supply, at the beginning of machining operation, the lower arm 12 with the machining fluid L for filling the work pan 16, by way of a passage defined by the lower arm 12.

Figure 5:
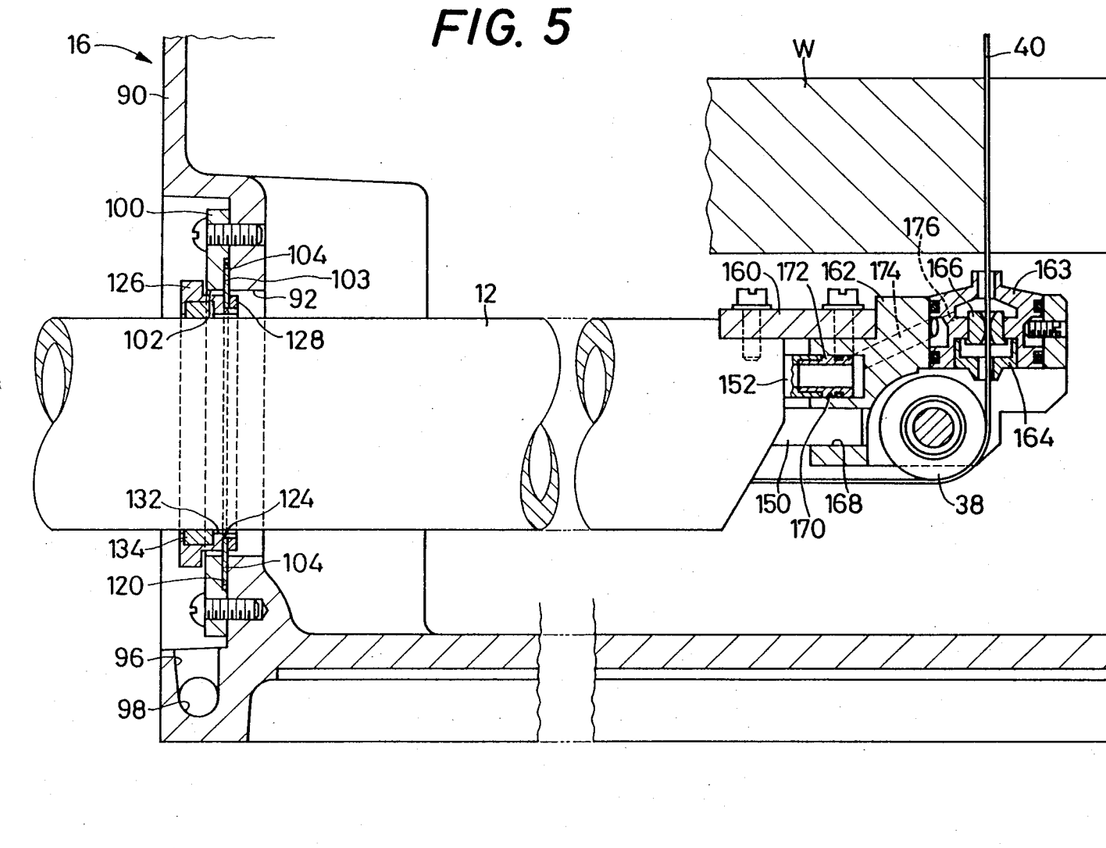
FIG. 5 is a partial enlarged cross section taken along the line 5—5 in FIG. 2.

On the innermost end of the lower arm 12 an electrically conductive bracket 162 is attached, as can be seen in FIG. 5, by way of an electrically insulating plate 160. On the tip of the bracket 162 a roller of the lower electrode guide 38 is in turn rotatably mounted for positioning as well as the changing direction of the wire electrode 40.

A pair of upper and lower cylindrical members 163, 164, with a built-in guide member 166 for guiding the wire electrode 40, are mounted on the bracket 162. In the bracket 162 a bore 168 is formed, in which the inner end of the power cable 150 is inserted. The necessary power for the wire electrode 40 is supplied from the power cable 150 via the bracket 162 and the lower electrode guide 38. In the bracket 162 a contact receptacle 170 is formed, to which the inner end of the fluid supply conduit 152 is connected by way of a coupling 172. The machining fluid L which is needed in the machining gap is supplied from the fluid supply conduit 152 via passages 174, 176 in the bracket 162 and the aforementioned upper cylindrical member 163 functioning as a nozzle.

Figure 3:
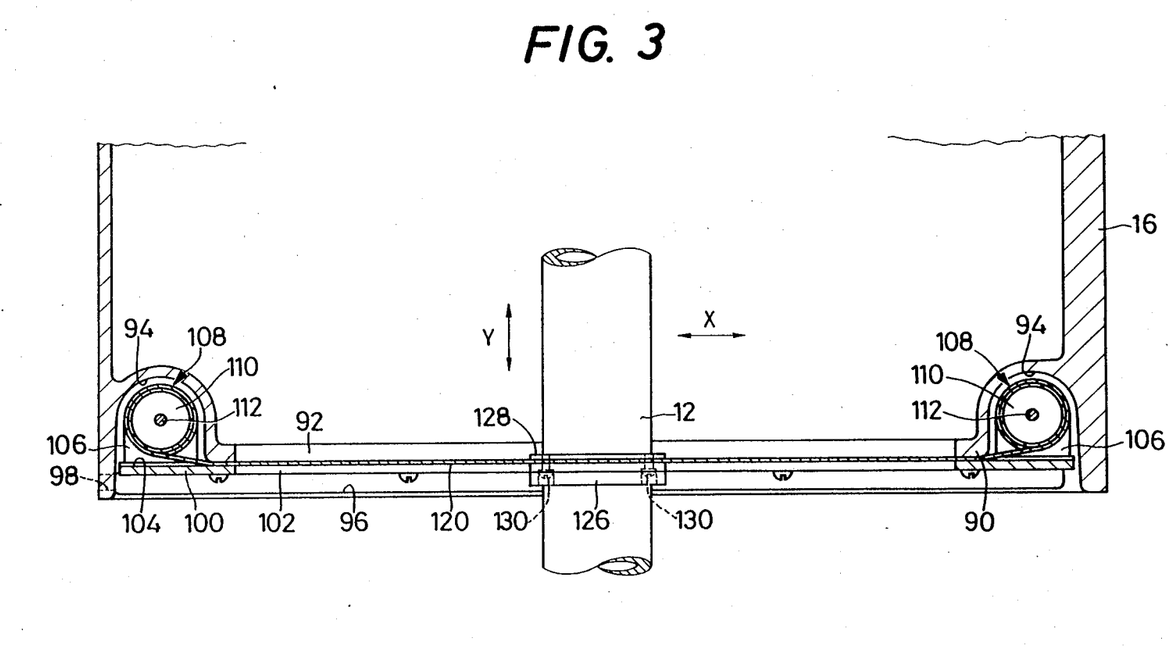
FIG. 3 is a partial cross section taken along the line 3—3 in FIG. 2.

When the wire cutting type electrical discharge machining system works, the work pan 16 needs to be moved in X-axis direction in FIG. 3. The closure strip 120 is naturally moved along the elongate aperture 92 causing in turn winding-up and unwinding of the end portions thereof at the opposite reels 108, 108. In the event of a relative movement of the lower arm 12, in respect to the work pan 16, in Y-axis direction, the lower arm 12 is moved back and forth sliding through the packing 134 attached to the closure strip 120. As can be understood from the above description, an imaginable gap, between the periphery of the elongate aperture 92 formed in the side wall 90 of the work pan 16 and the lower arm 12 extending therethrough, can always be kept in a well sealed state by virtue of the closure strip 120, leakage of the machining fluid L in the work pan 16 through that gap being substantially prevented.

The lower arm 12 in this embodiment is constituted of an electrically conductive tubular member and connected to the grounding terminal of the power circuit 58, besides, it contains therein the power cable 150 for connecting the other terminal of the power circuit 58 to the wire electrode 40. This structure greately contributes to absorption of electrical noise.

It is desirable that the closure strip is resilient enough for being wound up on the reels, but this property is not essential. Similar effects can also be expected from installing spring means for biasing the reels in a strip taking-up or collecting direction. Taking-up of the closure strip on the reels is not essential, either; it can be replaced by a strip with a pair of tension springs on either end thereof, which extends in U-shape when put in along the side wall containing the elongate aperture and the other two side walls which are continuously adjacent to the former. Even the flexibility itself is not indispensable for the closure strip, it may be on the contrary an elongate thin plate, if a condition that the strip may extend beyond the lateral ends of the elongate-aperture-containing side wall is allowed.

It is of course desirable for the lower arm to be cylindrical in its shape, from the view point of easiness of sealing, but it is also permissible to make the arm a tube having a square-shape section.

It will be obvious to those skilled in the art that various changes may be made without departing from the scope of the invention and the invention is not to be considered limited to what is shown in the drawings and described in the specification.

What is claimed is:

1. A wire cutting type electrical discharge machining system for removing metal by means of an electrical discharge energy between an electrically conductive workpiece and a wire electrode which is continuously fed lengthwise relative to the workpiece, comprising:

a work pan for supporting the workpiece therein, said work pan including a side wall which has an elongate aperture extending substantially horizontally;

a lower arm extending laterally through said elongate aperture inwardly into said work pan to a position below the workpiece, and carrying a lower electrode guide for guiding said wire electrode, said lower arm being movable relative to said work pan in a longitudinal direction thereof and in a longitudinal direction of said elongate aperture;

a closure strip disposed along said elongate aperture to close the elongate aperture substantially fluid-tightly, said closure strip being slidable in said longitudinal direction of the elongate aperture and having a hole in a longitudinal central portion thereof;

feed means for feeding said work pan and said lower arm relative to each other in any direction in a horizontal direction, thereby to feed said workpiece supported by the work pan in any desired direction in said horizontal plane;

a pair of reels rotatably supported by said work pan, opposite end portions of the closure strip being wound on said reels; and annular sealing means disposed on said closure strip adjacent to said hole, said lower arm fluid tightly and slidably extending through said annular sealing means, whereby said closure strip provides a fluid tight sealing between said work pan and said lower arm while allowing relative movements thereof in said two longitudinal directions.

2. The electrical discharge machining system of claim 1, wherein said side wall is provided with guide grooves along upper and lower sides of said elongate aperture for guiding therein upper and lower widthwise edge portions of said closure strip.

3. The electrical discharge machining system of claim 2, wherein said work pan is provided with a frame-like guide plate fixed to said side wall, said guide plate having in a central portion thereof an elongate opening of substantially the same dimensions as said elongate aperture so that the guide plate surrounds said elongate aperture, said guide plate having a shallow groove in one of opposite surfaces thereof facing an outer surface of said side wall of the work pan, said shallow groove extending along said elongate aperture and covering inner peripheral areas which define four sides of said elongate opening, said shallow groove and said outer surface of said side wall cooperating to define said guide grooves.

4. The electrical discharge machining system of claim 1, wherein said lower arm is a tubular member made of an electrically conductive material, said tubular member defining therein a passage for said wire electrode, and a passage for a power cable to supply power to said wire electrode such that said power cable is electrically insulated from said tubular member, said tubular member being connected to a grounding terminal of a power source, and said power cable being connected to the other terminal of the power source.

5. The electrical discharge machining system of claim 1, wherein said closure strip is made of a flexible material.

6. The electrical discharge machining system of claim 1, wherein said lower arm is a tubular member which serves as at least one of a conduit for supplying a machining fluid to said work pan, and a conduit for discharging said machining fluid.

7. The electrical discharge machining system of claim 1, wherein said lower arm is a tubular member through which said wire electrode extends to run.

8. A wire cutting type electrical discharge machining system for removing metal by means of an electrical discharge energy between an electrically conductive workpiece and a wire electrode which is continuously fed lengthwise relative to the workpiece, comprising:

a work pan for supporting the workpiece therein, said work pan including a side wall which has an elongate aperture extending substantially horizontally;

a lower arm extending laterally through said elongate aperture inwardly into said work pan to a position below the workpiece, and carrying a lower electrode guide for guiding said wire electrode, said lower arm being movable relative to said work pan in a longitudinal direction thereof and in a longitudinal direction of said elongate aperture;

a pair of reels rotatably supported by said work pan;

a closure strip made of a flexible material and disposed along said elongate aperture to close the elongate aperture substantially fluid-tightly, said closure strip being slidable in said longitudinal direction of the elongate aperture and having a hole in a longitudinal central portion thereof, opposite end portions of the closure strip being wound on said pair of reels, respectively; and annular sealing means disposed on said closure strip adjacent to said hole, said lower arm fluid-tightly and slidably extending through said annular sealing means, whereby said closure strip provides a fluid-tight sealing between said work pan and said lower arm while allowing relative movement thereof in said two longitudinal directions.

9. The electrical discharge machining system of claim 8, wherein said work pan has a pair of recesses at opposite ends of said side wall as viewed in said longitudinal direction of said elongate aperture, said recesses being open in an outer surface of said side wall and accommodating said pair of reels, respectively.

10. The electrical discharge machining system of claim 8, wherein said closure strip is made of a resilient material and takes a suitable form to enable said opposite end portions thereof to be wound on said pair of reels by their own resiliency, a straight central portion of said closure strip extending along said elongate aperture and being curved in an arcuate shape in cross section taken across a width thereof.

11. A wire cutting type electrical discharge machining system for removing metal by means of an electrical discharge energy between an electrically conductive workpiece and a wire electrode which is continuously fed lengthwise relative to the workpiece, comprising:

a work pan for supporting the workpiece therein, said work pan including a side wall which has an elongate aperture extending substantially horizontally;

a lower arm extending laterally through said elongate aperture inwardly into said work pan to a position below the workpiece, and carrying a lower electrode guide for guiding said wire electrode, said lower arm being movable relative to said work pan in a longitudinal direction thereof and in a longitudinal direction of said elongate aperture;

a closure strip disposed along said elongate aperture to close the elongate aperture substantially fluid-tightly, said closure strip being slidable in said longitudinal direction of the elongate aperture and having a hole in a longitudinal central portion thereof;

a pair of reels which are rotatably supported by said work pan, opposite end portions of the closure strip being wound on said reels;

annular sealing means disposed on said closure strip adjacent to said hole, said lower arm fluid-tightly and slidably extending through said annular sealing means, whereby said closure strip provides a fluid-tight sealing between said work pan and said lower arm while allowing relative movement thereof in said two longitudinal directions.

* * * * *